US006451147B1

(12) United States Patent
Parker et al.

(10) Patent No.: US 6,451,147 B1
(45) Date of Patent: Sep. 17, 2002

(54) SIMPLE PRESSURE SEAL METHODS

(75) Inventors: Rebecca L. Parker, Grand Island, NY (US); Richard C. Meyer, Alfred, ME (US)

(73) Assignee: Moore North America, Inc., Stamford, CT (US)

( * ) Notice: Subject to any disclaimer, the term of this patent is extended or adjusted under 35 U.S.C. 154(b) by 0 days.

(21) Appl. No.: 09/986,950

(22) Filed: Nov. 13, 2001

Related U.S. Application Data

(62) Division of application No. 09/866,803, filed on May 30, 2001, now Pat. No. 6,332,939, which is a division of application No. 09/721,958, filed on Nov. 27, 2000, now Pat. No. 6,312,544, which is a division of application No. 09/274,992, filed on Mar. 24, 1999, now Pat. No. 6,340,406.

(51) Int. Cl.[7] ................................................ B32B 31/20

(52) U.S. Cl. ....................... 156/227; 156/443; 156/580; 53/562; 271/2; 271/184; 271/225

(58) Field of Search ................................ 156/217, 227, 156/443, 538, 539, 580; 53/562; 271/2, 184, 225; 270/45

(56) References Cited

U.S. PATENT DOCUMENTS 891,277 A 6/1908 Markoe
2,072,790 A 3/1937 Apitzsch et al.
4,371,416 A 2/1983 Denzin
4,428,794 A 1/1984 Hayskar et al.
4,609,421 A 9/1986 Yui
4,657,238 A 4/1987 Nishikawa
4,701,233 A 10/1987 Beck et al.
4,875,965 A 10/1989 Marzullo
4,918,128 A 4/1990 Sakai
4,924,652 A * 5/1990 Krasuski et al. .............. 53/117
5,098,511 A 3/1992 Barnes
5,133,828 A * 7/1992 Jacques ...................... 100/327
5,201,464 A 4/1993 File
5,258,045 A 11/1993 Yamashita
5,427,851 A 6/1995 Mehta
5,772,841 A 6/1998 Lindsay
5,814,183 A 9/1998 Miller
5,865,925 A 2/1999 Lindsay
5,968,308 A 10/1999 Lindsay
6,024,682 A * 2/2000 Mandel et al. ................ 270/32

* cited by examiner

*Primary Examiner*—Sam Chuan Yao
(74) *Attorney, Agent, or Firm*—Nixon & Vanderhye PC

(57) ABSTRACT

A simplified pressure sealing apparatus for acting on business forms having pressure activated cohesive to seal the cohesive has only two or three pressure-seal rollers for effecting proper sealing. The pressure seal rollers may receive a folded business form substantially immediately from the output of a folder, or one of the pressure-seal rollers may function to both assist in folding the form, and then pressure sealing it. The form may be held in a flip plate above the nip between first and second pressure-seal rollers, or a separate set of idler nip wheels may hold the form in position once it has passed completely through the sealing nip. In either case the form may pass completely through the sealing nip yet be moved through the sealing nip in the opposite direction, and then diverted to a stack.

3 Claims, 7 Drawing Sheets

SIMPLE PRESSURE SEAL METHODS

This application is a division of application Ser. No. 09/866,803, filed May 30, 2001 now U.S. Pat. No. 6,332,939, which was a division of application Ser. No. 09/721,958 filed Nov. 27, 2000 now U.S. Pat. No. 6,312,544, which was a division of application of Ser. No. 09/274,992 filed Mar. 24, 1999 now U.S. Pat. No. 6,340,406, the entire content of each of which is hereby incorporated by reference in this application.

BACKGROUND AND SUMMARY OF THE INVENTION

Business forms, particularly mailer type business forms, having pressure sensitive cohesive (such as the type shown in U.S. Pat. Nos. 4,918,128 and 5,427,851 and sold commercially by Toppan Forms Ltd. of Japan under the trade designation TN-124), are becoming increasingly popular because of the significant advantages associated with the use of pressure activated cohesive as opposed to heat activated adhesive or rewettable adhesive. One of many examples of business forms utilizing this pressure activated cohesive is shown in U.S. Pat. No. 5,201.464 (the disclosure of which is hereby incorporated by reference herein). A wide variety of different types of pressure sealing equipment, such as that sold by Moore North America, Inc. under the trademark "SpeediSealer"® has been developed for utilization with such forms, typically such equipment having at leas. two sets of in-line pairs of pressure-seal rollers to apply a sealing force of at least about 100 pounds per lineal inch to effect proper sealing of folded forms, having the cohesive thereon. Much of this equipment is expensive, however, and particularly the pressure-seal rollers themselves can be very expensive. Therefore, there has been a desire to reduce the complexity and expense of such equipment particularly for low or mid-volume installations.

One prior art pressure seal piece of equipment that is greatly simplified, using only two pressure-seal rollers in association with a reversible motor, is disclosed in U.S. Pat. No. 5,133,828 (the disclosure of which is hereby incorporated by reference herein). While that equipment is very useful, it is impractical to automate, the forms do not pass completely through the nip between pressure-seal rolls before they are reversed during normal operation and therefore sometimes one edge of the form may not be sealed as securely as desired, and the sealer is distinct from the folding equipment for folding business form intermediates (such as in U.S. Pat. No. 5,201,464) into folded business forms (e.g. mailers). According to the present invention an apparatus and method are provided which allow for automation, or at least semi-automatic operation, of simplified pressure seal equipment, pass the forms completely through the nip between pressure seal rollers during operation, may be placed immediately at the output (or near the output) of the folder, and in one embodiment even comprise part of the folder so that one of the pressure-seal rollers functions both to effect folding and sealing. Despite these advantages, the apparatus according to the invention comprises only two rollers, or in the embodiment where a portion of the conventional folder has been eliminated only three pressure-seal rollers, so that the equipment is simple and relatively inexpensive.

According to one aspect of the present invention a pressure sealing apparatus for acting on business forms having pressure activated cohesive, to seal the cohesive, is provided. The apparatus comprises: First and second pressure-seal rollers rotatable about substantially parallel first and second axes of rotation, respectively, and in operative association with each other so as to define a nip which supplies sufficient pressure so as to activate pressure activated cohesive on a business form passing through the nip. Drive means for driving at least one of the pressure-seal rollers to effect movement of a business form completely through the nip. And holding means for holding a business form having pressure activated cohesive in a position distinct from the nip but so that the business form will substantially automatically be engaged by and pass through the nip upon operation of the drive means.

In one embodiment the holding means may comprise a primarily vertically disposed chute positioned with respect to the nip so that a business form within the chute and not within the nip will be biased at least partly by gravity toward or into contact with one of the pressure-seal rollers or the nip.

In one embodiment using a chute, the drive means comprises reversible drive means (such as a reversible electric motor or any other conventional type of drive) for driving at least one of the pressure-seal rollers alternatively clockwise and counterclockwise, and the pressure-seal rollers consist essentially of (only) first and second rollers. The apparatus may further comprise a business form folder having a discharge disposed substantially immediately below the nip on the opposite side thereof from the chute, so that folded business forms are fed by the folder into the nip.

The apparatus may still further comprise a diverter positioned adjacent the folder discharge for diverting sealed forms passing through the nip from the chute away from the folder.

In another embodiment using the substantially vertical chute, the pressure-seal rollers consist essentially of (only) the first and second rollers and a third roller rotatable about a third axis of rotation substantially parallel to the first and second axes of rotation, and in operative association with the first roller so as to define a second nip which supplies sufficient pressure so as to activate pressure activated cohesive on a business form passing through the second nip. This embodiment may further comprise a business form folder, including a first folder roller rotatable about a fourth axis of rotation substantially parallel to the third axis, and operatively positioned with respect to the third pressure-seal roller and first and second fold plates so that the third roller effects folding of a business form passing between the third pressure-seal roller and the first folder roller, and effects sealing of the business form when passing from the second fold plate through the second nip. In the embodiment the business form folder may consist essentially of (only) the first folder roller, a second folder roller on the opposite side of the first folder roller from the third pressure-seal roller, the third pressure-seal roller, the first and second fold plates, and a feed table for feeding business forms to be folded into a nip between the first and second folder rollers.

The pressure-seal rollers may be positioned with respect to each other so that imaginary lines passing through the axes of rotation thereof have substantially an L-shape. The drive means (such as a conventional electric motor, or any other conventional type of drive) may drive the pressure-seal roller continuously in a first direction of rotation. While the rollers may provide only edge seal, in a preferred embodiment the pressure-seal rollers each have a substantially continuous constant diameter peripheral surface having a length sufficient to engage substantially all surface area of a business form face brought into contact therewith.

The holding means may take a wide variety of other forms aside from the vertically disposed chute, and/or the vertically disposed chute may have spring leafs, elastic portions, or other elements associated therewith for properly retaining the form. For example, the holding means may comprise spring leaves spring pressed into engagement with each other, or any other suitable conventional device for properly holding a business form or sheet of paper in a releasable manner in a particular location. For example, the holding means may comprise a pair of idler nip rollers, particularly where the drive means comprises reversible drive means for driving at least one of the pressure-seal rollers alternately clockwise and counterclockwise, wherein the pressure-seal rollers consist essentially of the first and second rollers. The holding means may further comprise a conveyor having a business form-engaging conveying surface extending substantially transverse to the pressure-seal rollers and substantially in alignment with the nip and idler nip wheels. For example, the conveyor may comprise a belt conveyor driven by a reversible drive and positioned to assist in feeding a business form to be sealed into the nip and into association with the idler nip wheels. In this embodiment typically the pressure-seal roller axes are substantially vertical; and the structure further comprises a forms guide positioned in association with respect to the belt conveyor to guide forms into contact with the belt conveyor to be fed to the nip, the forms guide mounted on the opposite side of the nip from the idler nip wheels. The apparatus may further comprise a forms deflector mounted with respect to the nip and constructed so as to allow a business form within the forms guide to pass through the nip into contact with the idler nip wheels, but will deflect the business form away from the forms guide when passing from the idler nip wheels through the nip. In this embodiment too while the rollers may comprise edge seal rollers, preferably the pressure-seal rollers each have a substantially continuous constant diameter peripheral surface having a length sufficient to engage substantially all surface area of a business form face brought into contact therewith.

According to another aspect of the present invention a pressure-seal apparatus is provided comprising the following components: Pressure-seal rollers consisting essentially of first and second pressure-seal rollers rotatable about substantially parallel first and second axes of rotation, respectively, and in operative association with each other so as to define a first nip; and a third pressure-seal roller rotatable about a third axis of rotation substantially parallel to the first and second axes of rotation, and in operative association with the first roller so as to define a second nip. The pressure-seal rollers are positioned with respect to each other so that imaginary lines passing through the axes of rotation thereof have substantially an L-shape. Holding means located above the first nip for holding a folded sheet after it has passed through the second nip in such a manner that the trailing edge of the folded sheet is forced to follow the surface of the first roller as it rotates, thereby introducing the trailing edge into the first nip, where it becomes the leading edge of the folded sheet. And drive means for driving at least one of the rollers to effect movement of a folded sheet through the nips.

The invention also relates to a method of handling a business form having patterns of pressure activated cohesive, using first and second fold rollers, and first, second and third pressure-seal rollers, first and second plates, and a holding device above the first and second pressure-seal rollers. The method may comprise substantially automatically: (a) Feeding a business form (e.g. an unfolded intermediate) between the first and second fold rollers and into the first fold plate, to introduce a first fold therein. (b) Feeding the form from the first fold plate to between the first fold roller and the third pressure-seal roller and then to the second fold plate to introduce a second fold therein. (c) Feeding the form from the second fold plate to between the third and first pressure-seal rollers to effect activation of pressure activated cohesive on the form, and to the holding device above the first and second pressure-seal rollers. And (d) feeding the form from the holding device to between the first and second pressure-seal rollers to effect activation of pressure activated cohesive on the form so that the form is held in folded condition. The folding may be C-fold, Z-fold, or a double fold, eccentric or uniform.

In the method, (a)–(d) may be the only operations necessary for effective folding of the business form and sealing of the folded business form. The method may further comprise (e), after (d), diverting the form from between the first and second rollers to a stack. The method may also further comprise spring pressing the third and second pressure-seal rollers into contact with the first pressure-seal roller to provide a sealing pressure between both the third and first pressure-seal rollers, and first and second pressure-seal rollers, of at least about 100 pounds/lineal inch. Also, the method may further comprise driving only the first pressure-seal roller, the third and second pressure-seal rollers being driven by engagement with the first pressure-seal roller. In the practice of the method the pressure-seal rollers may each have a substantially continuous constant diameter peripheral surface having a length sufficient to engage substantially all surface area of a business form face brought into contact therewith; and (c) and (d) may be practiced to apply a pressure of at least about 100 (e.g. 100–200) pounds/lineal inch across substantially the entire surface of the folded form.

According to yet another aspect of the invention there is provided a method of handling a business form having patterns of pressure activated cohesive, using first and second pressure-seal rollers defining a nip there between, and a holding device above the nip between the first and second pressure-seal rollers, comprising substantially automatically: (a) Feeding a folded business form from a folder into the nip from below the nip. (b) Driving one or both of the pressure-seal rollers to move the form up through the nip into the holding device while activating pressure activated cohesive on the form.

And (c) after the form has passed completely through the nip, reversing the direction of rotation of the pressure-seal rollers to move the form downwardly through the nip to effect activation of pressure activated cohesive on the form so that the form is held in folded condition.

In this aspect of the invention, the method may further comprise (d) diverting the form away from the folder as the form is passed downwardly during the practice of (c).

In fact (d) may be practiced by moving a diverter automatically in response to reversing the direction of rotation of the pressure-seal rollers. In the practice of the method the pressure-seal rollers may each have a substantially continuous constant diameter peripheral surface having a length sufficient to engage substantially all surface area of a business form face brought into contact therewith; and (b) and (c) may be practiced to apply a pressure of at least about 100 pounds/lineal inch across substantially the entire surface of the folded form.

According to still another aspect of the invention there is provided a method of handling a business form having patterns of pressure activated cohesive, using first and second pressure-seal rollers rotatable about substantially vertical axes and defining a nip therebetween, and a holding device on a second side of the nip opposite a first side, comprising substantially automatically: (a) Feeding a folded business form to a first position on the first side of the nip. (b) Moving the form substantially horizontally into the nip. (c) Driving one or both of the pressure-seal rollers to move the form substantially horizontally through the nip into contact with the holding device while activating pressure activated cohesive on the form. And (d) after the form has passed completely through the nip, reversing the direction of rotation of the pressure-seal rollers to move the form back toward the first side of the nip through the nip to effect activation of pressure activated cohesive on the form so that the form is held in folded condition.

In this aspect of the method, there may further comprise (e) automatically diverting the form away from the first position during the practice of (d). Also, (a) may be practiced by effecting guiding substantially downward movement of the folded form while the form is in a substantially vertical plane.

It is the primary object of the present invention to provide a simple yet effective method and apparatus for substantially automatically sealing, or folding and then sealing, business forms having pressure activated cohesive. This and other objects of the invention will become clear from an inspection of the detailed description of the invention, and from the appended claims.

DETAILED DESCRIPTION OF THE DRAWINGS

Figure 1A:
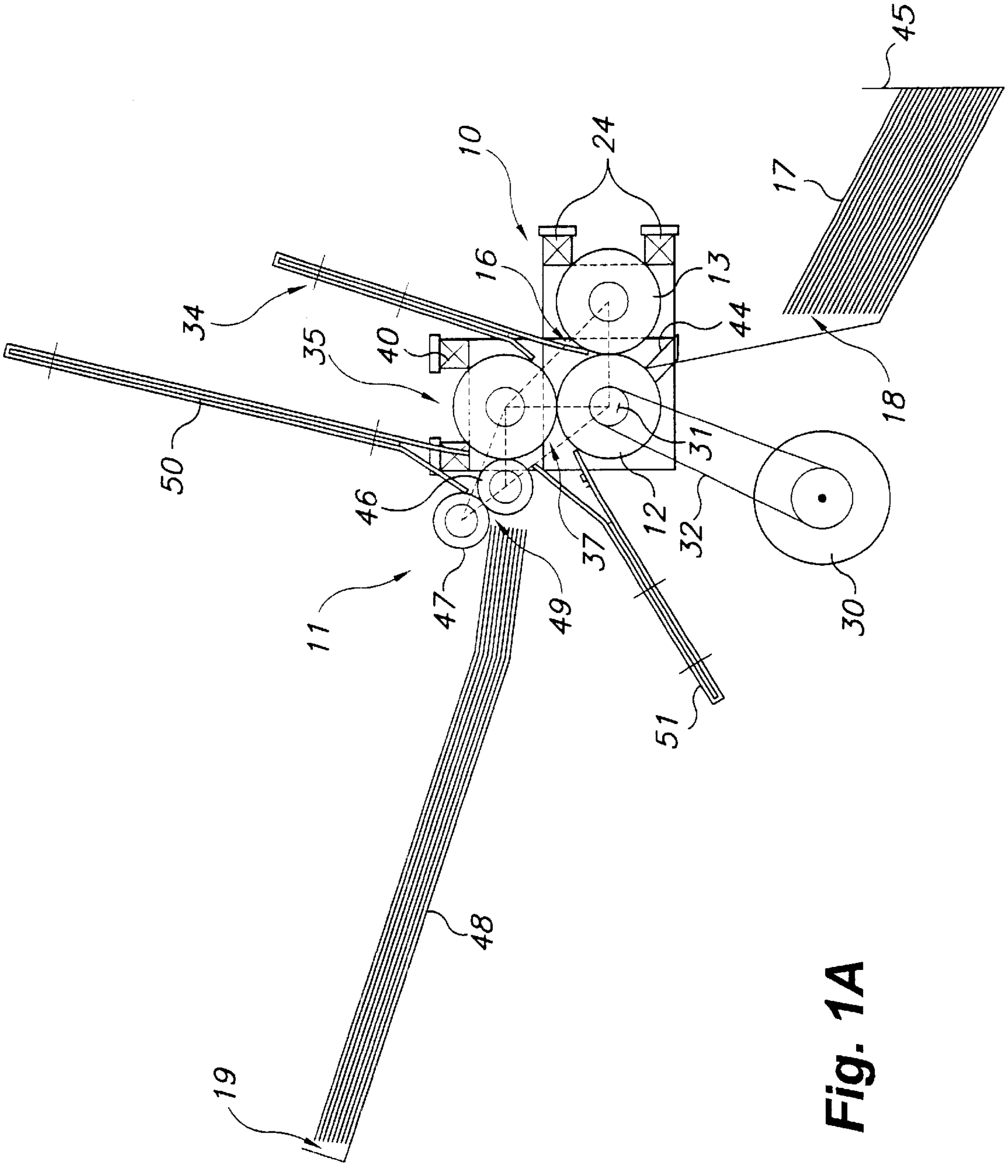
FIGS. 1A and B are side schematic views of first and second embodiments of apparatus according to the present invention, for both folding and then sealing business forms having pressure activated cohesive.

The pressure sealing apparatus embodiment of FIG. 1A is shown generally by reference numeral 10, and is in association with part of a conventional folder, shown generally by reference numeral 11 in FIG. 1A. In the embodiment of FIG. 1A the pressure sealing apparatus 10 comprises first, 12, and second, 13, pressure-seal rollers rotatable about substantially parallel first and second axes (see FIG. 2) 14, 15, respectively. The rollers 12, 13 are mounted in operative association with each other so as to define a first nip 16 which supplies sufficient pressure so as to activate pressure activated cohesive on a business form 17 (a stack of forms 17 after folding being illustrated at 18 in FIG. 1A; and a stack of unfolded intermediates that are folded and sealed to make the business form 17 being shown at 19 in FIG. 1A) that passes through the nip 16.

Figure 2:
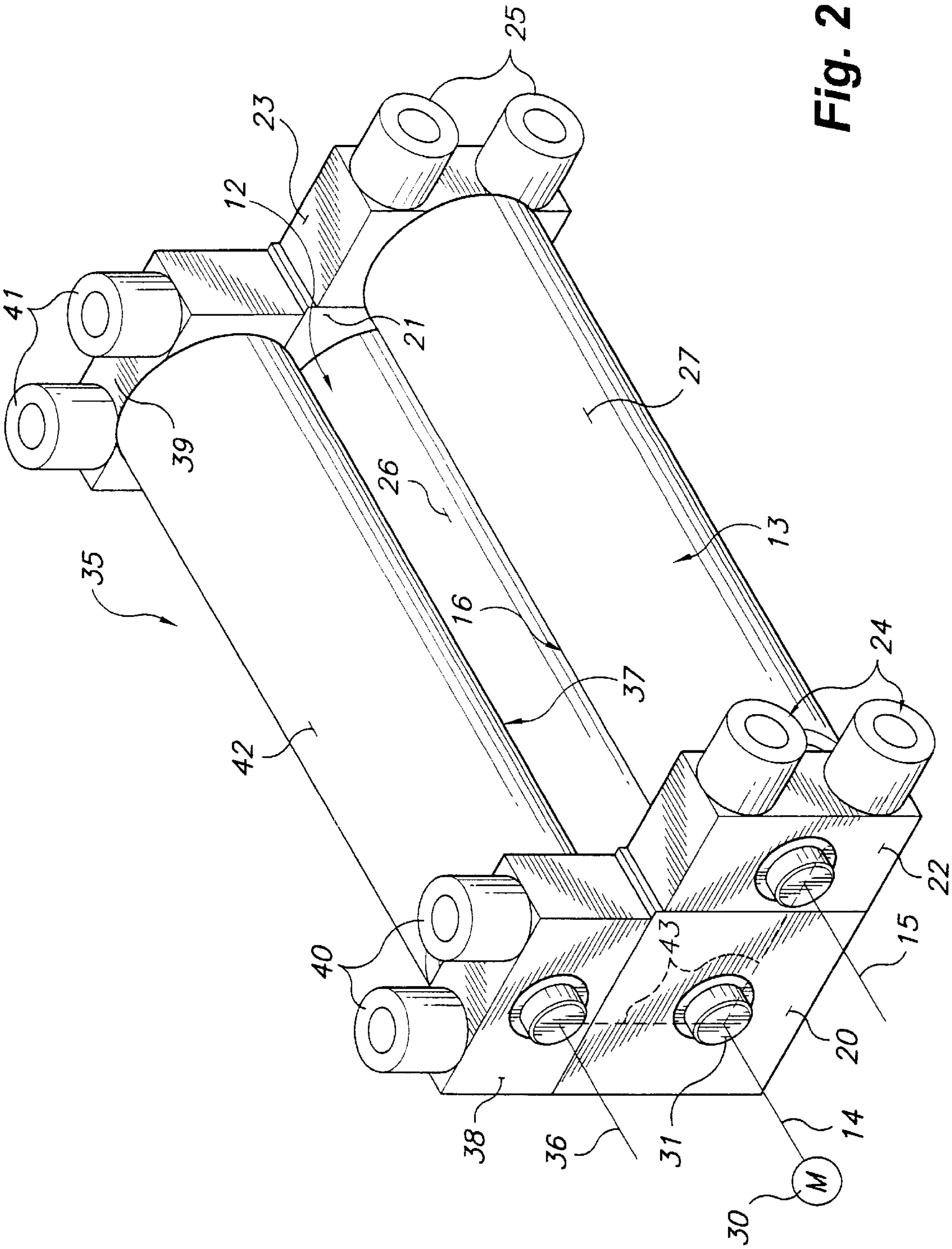
FIG. 2 is a top perspective view of just the pressure-seal roller assembly of the apparatus of either FIG. 1A or FIG. 1B.

The rollers 12, 13 may be mounted in the position illustrated in FIGS. 1A and 2 in a conventional manner including by mounting blocks, 20, 21 for the roller 12, and 22, 23 for the roller 13 (see FIG. 2). The rollers 12, 13 may be mounted so that there is a slight (and perhaps adjustable) gap between them. In the embodiment actually illustrated, however, conventional die spring assemblies 24, 25 are provided in association with the blocks 22, 23 to bias the roller 13 into contact with the roller 12, to provide a force sufficient to supply a pressure of at least about 100 (e.g. 100–200) pounds per lineal inch to a form 17 passing through the nip 16.

In the embodiment illustrated in FIGS. 1A and 2, the rollers 12, 13 each have a substantially continuous constant diameter peripheral surface 26, 27, respectively (see FIG. 2), having a length sufficient to engage substantially all surface area of a business form 17 brought into contact therewith. Alternatively, the surfaces 26, 27 may be interrupted with rubber belts and grooves, may be segmented, or may only provide peripheral sealing (such as the rollers actually illustrated in U.S. Pat. No. 5,133,828). The rollers 12, 13 are preferably solid, but may be hollow metal tubes with pressed-in end caps.

The apparatus 10 also comprises drive means for driving at least one of the rollers 12, 13 to effect movement of a business form completely through the nip 16. While the drive means may comprise any suitable conventional drive, such as any type of conventional motor with associated gears, pulleys, chains, sprockets, belts, or the like, in the embodiment illustrated in FIGS. 1A and 2 the first roller 12 is driven by an electric motor 30 which is connected to the shaft 31 (see FIG. 2) of the roller 12 defining the axis 14 by a belt or chain 32 (see FIG. 1A) and associated pulleys or sprockets. The motor 30 need not be reversible, and preferably substantially continuously rotates the roller 12 in the clockwise direction (as illustrated in FIG. 1A). Because of the engagement of the peripheral surfaces 26, 27 of the rollers 12, 13, rotation of the roller 12 effects rotation of the roller 13 in a counterclockwise direction. Alternatively, the rollers 12, 13 may be connected together by gears, or a separate drive in sync with the motor 30 may be provided for the roller 13.

The pressure sealing apparatus 10 also comprises a holding means for holding a business form 17 having pressure activated cohesive in a position distinct from the nip 16 but so that the business form 17 will substantially automatically be engaged by and pass through the nip 16 upon operation of the drive means 30, 31, 32, etc. While the holding means may comprise any suitable clamping or holding mechanism for holding a form or document in a particular position, in the embodiment illustrated in FIG. 1A, the holding means comprises a primarily vertical flip plate 34 mounted above the nip 16, and positioned with respect to the nip 16 so that the trailing edge of a business form 17 entering the flip plate 34, after passing through the nip 37 (e.g. substantially completely in the flip plate 34) will be forced to follow the peripheral surface 26 of roller 12 until it enters the nip 16, thus becoming the leading edge of form 17. In the embodiment illustrated the flip plate 34 may be made out of sheet metal or plastic, and is substantially the same as a conventional fold plate in a buckle folder, and typically is adjustable to have an effective interior length between about 3.6 and 5.5 inches.

In the embodiment illustrated in FIG. 1A, the pressure seal apparatus 10 consists essentially of, in addition to the elements previously described, a third pressure-seal roller 35 which preferably is substantially the same as the rollers 12, 13 and is rotatable about a third axis 36 (see FIG. 2) substantially parallel to the axes 14, 15 and in operative association with the first roller 12 so as to define a second nip 37 which supplies sufficient pressure so as to activate pressure activated cohesive on a business form 17 passing through the second nip 37. While the third roller 35 may have any suitable conventional relationship with the first roller 12 (as described above for the rollers 12, 13), in the embodiment illustrated in the drawings the roller 35 is mounted by the blocks 38, 39 and has conventional spring biasing means/elements 40, 41 for biasing the roller 35 peripheral surface 42 into contact with the surface 26 of the roller 12. Rotation of the roller 12 in a clockwise direction thus effects rotation of the roller 35 in a counterclockwise direction, and a pressure of at least about 100 pounds per lineal inch is applied to the form 17 by the rollers 35, 12 passing through the second nip 37.

As is readily seen in FIGS. 1A and 2, the axes 36, 14, 15 are on the apices of a right triangle, or, looking at it another way, the imaginary lines 43 passing through the axes 36, 14 and 14, 15, respectively (see FIG. 2) are substantially L-shaped. The roller 35 may also have any suitable configuration, but preferably is comparable to the configuration of the rollers 12, 13, e.g. in the embodiment illustrated in FIG. 2 having a substantially continuous peripheral surface.

By feeding a folded form 17 first between the second nip 37, then into the flip plate 34, and then through the first nip 16, after passing through the first nip 16, the form 17 is deflected by the diverter 44 to the stack 18, e.g. in a sheet metal stacking bin 45.

Not only does the pressure seal apparatus 10 have one less roller than most conventional pressure seal apparatus, it cooperates with the otherwise conventional folder 11 so as to eliminate two conventional fold rollers in the folder 11.

The folder 11 in the structure of FIG. 1A consists essentially of a first conventional folder roller 46 rotatable about an axis substantially parallel to the axis 36, and a second conventional fold roller 47 cooperating with the first roller 46 on one side thereof, the first fold roller 46 cooperating with the third pressure-seal roller 35 and positioned with respect thereto to effect folding. The folder 11 further consists essentially of a feed table 48 for feeding the business forms from the stack 19 into a nip 49 between the fold rollers 46, 47; and a first conventional fold (or flip) plate 50, and a second conventional fold (or flip) plate 51. The elements 48, 49, 50, and 51 are positioned in a similar manner to that in a conventional buckle folder except that since the roller 46 cooperates with the roller 35 the second fold plate 51 is positioned so as to receive the form during folding from the first fold plate 50, and then to direct the folded form into the second nip 37.

In operation of the apparatus 10, 11, in the method of handling a business form having patterns of pressure activated cohesive, according to the present invention, first the business form from the stack 19 is fed between the first and second fold rolls 46, 47, into the first fold plate 50, to introduce a first fold therein, as is conventional. Then the form is fed from the first fold plate to between the first fold roller 46 and the pressure-seal roller 35 and then into the second fold plate 51 to introduce a second fold therein, as is conventional (except that in the conventional folder a second set of rollers like the rollers 46, 47 is provided between the fold plates 50, 51 instead of the third pressure-seal roller 35 cooperating with the first fold roller 46, according to the invention). Then the form is fed from the second fold plate 51 to the nip 37, as is conventional (except that in the conventional folder the additional aforementioned second set of rollers would be provided instead of pressure-seal rollers 35, 12 to perform this fold), passage of the folded form 17 through the nip 37 effecting actuation of the pressure activated cohesive thereon. Then the folded form 17 passes to the flip plate 34 constructed as a conventional fold plate, and positioned above the nip 16. Then the trailing edge of form 17 follows the peripheral surface 26 of roller 12 as it-turns clockwise, and thus the trailing edge of form 17 is pulled down into the nip 16 and becomes the leading edge of the form 17. The nip 16 between rollers 12, 13 effects activation of the pressure activated cohesive thereon so that the form 17 is held in a folded condition. The above described steps are the only operations necessary to effect folding of the form 17 and sealing thereof.

When passing through the first nip 16, the form 17 is diverted by the diverter 44 into the stack 18 in the stacking bin 45. In the embodiment illustrated the rollers 35, 13 are spring biased into contact with the roller 12 so that driving only the first roller 12, with the drive means 30–32, also drives the rollers 13, 35 by engagement of the peripheral surfaces 26, 27, 42 thereof. At each of the second nip 37 and the first nip 16, a pressure of at least about 100 pounds per lineal inch is applied to the form 17 to effect sealing thereof. In the embodiment illustrated in the drawings, a pressure seal is provided by the constant diameter peripheral surfaces 26, 27, 42 over substantially the entire surface of the form 17 when fed through the nips 37, 16.

Figure 1B:
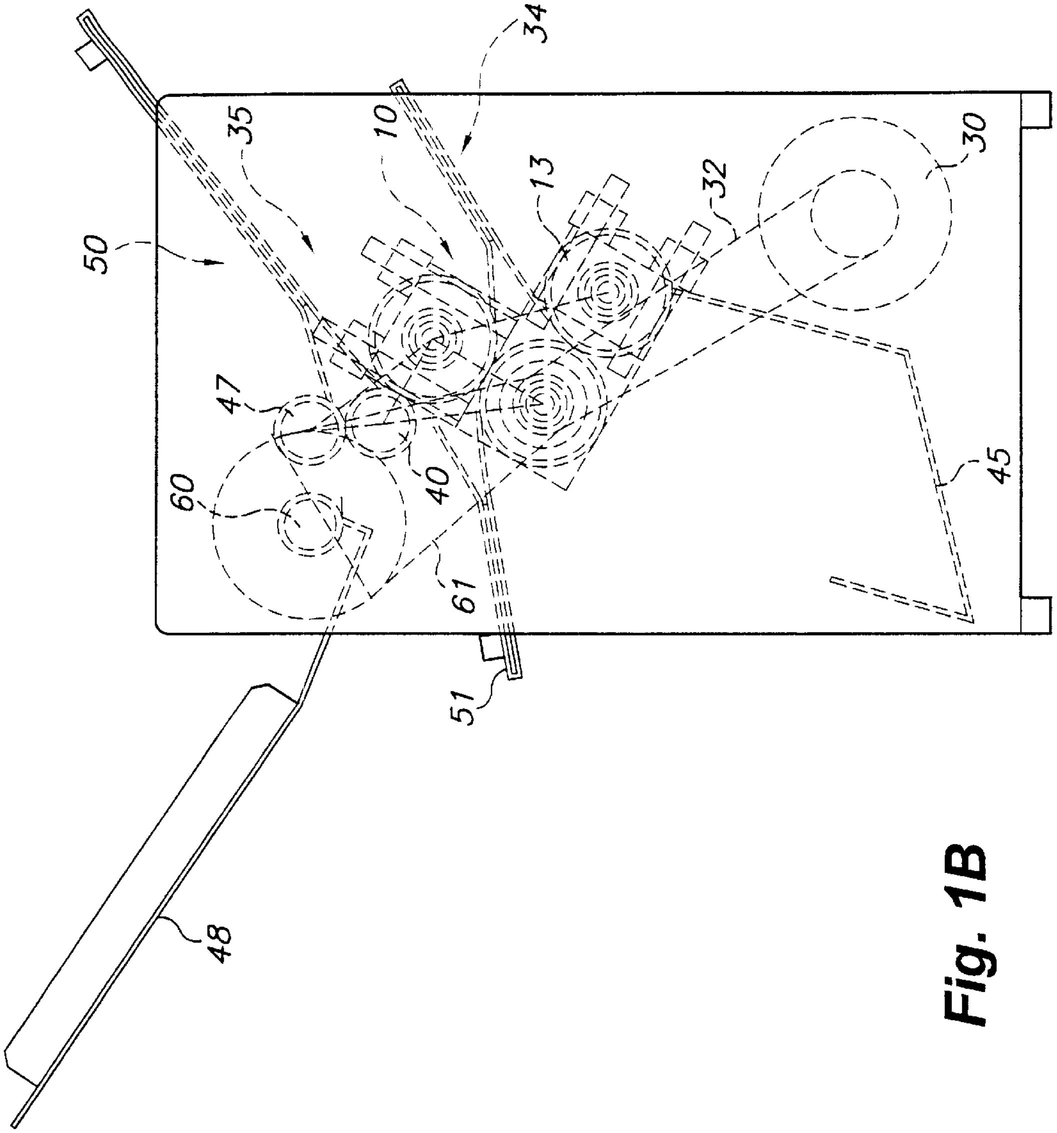

FIG. 1B is a side schematic view of a second embodiment of apparatus according to the present invention that is substantially the same as the FIG. 1A embodiment except for the relative positions of the components. All of the components in FIG. 1B that are the same as those in FIG. 1A are shown by the same reference numeral. The major differences between the FIG. 1B and the FIG. 1A embodiments are: The positions of the outfeed bin 45 and the motor 30 are swapped, the bin 45 faces left instead of right, and the motor 30 is repositioned. That is, the motor 30 in the FIG. 1B embodiment, compared to the FIG. 1A embodiment, is moved to a position under the second roller 13. The angles of the various parts are slightly different compared to those in the FIG. 1A embodiment (e.g. although the flip plate 34 is still above the nip 16 it does not make as steep an angle leading into the nip 16). Also a separate feed nip wheel 80 is provided associated with the infeed tray 48, which wheel 80 is driven by the roller 12 through a nip feed drive belt 81.

Figure 3:
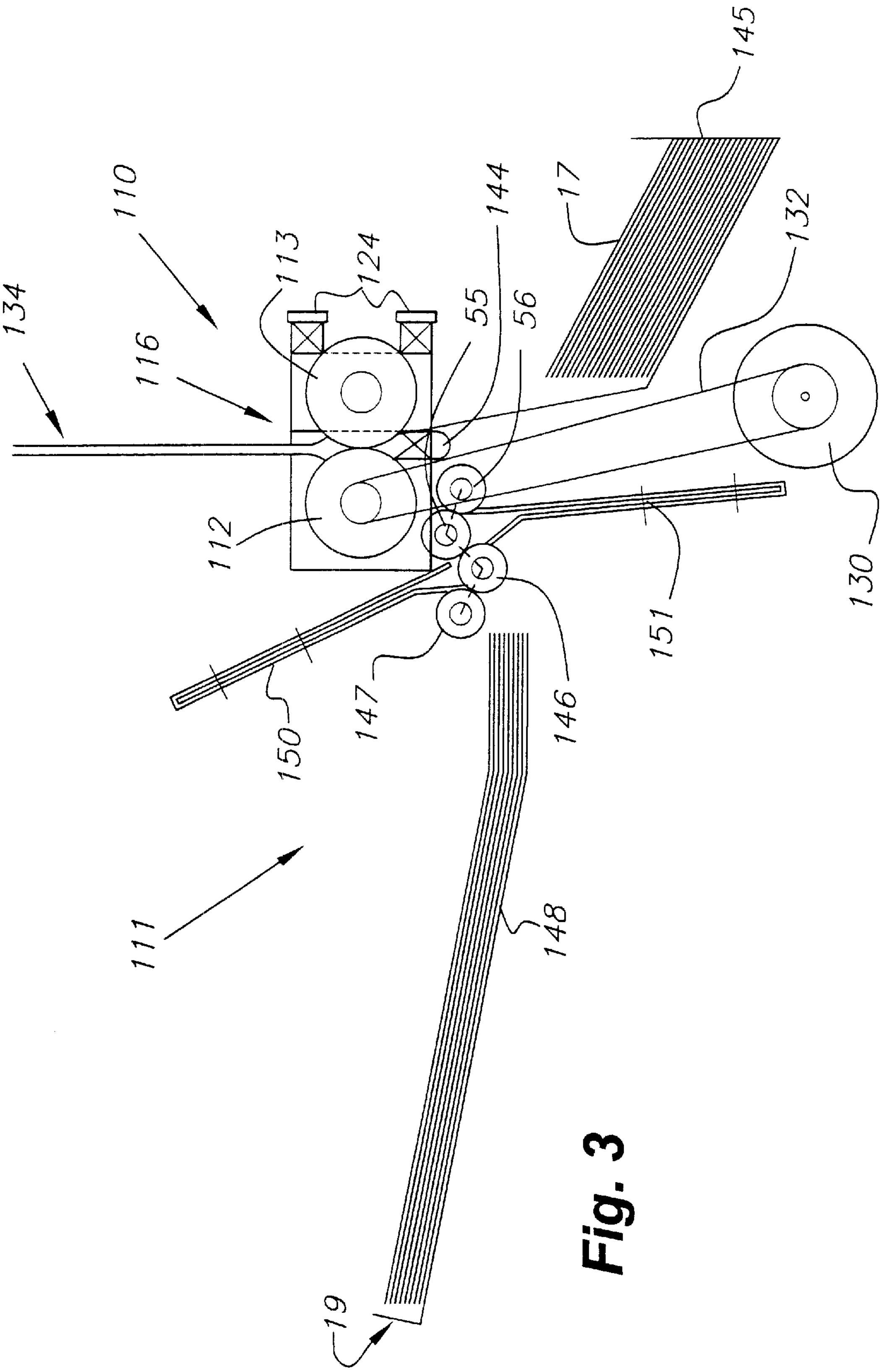
FIG. 3 is a view like that of FIG. 1A only for another embodiment of apparatus according to the present invention.
Figure 4:
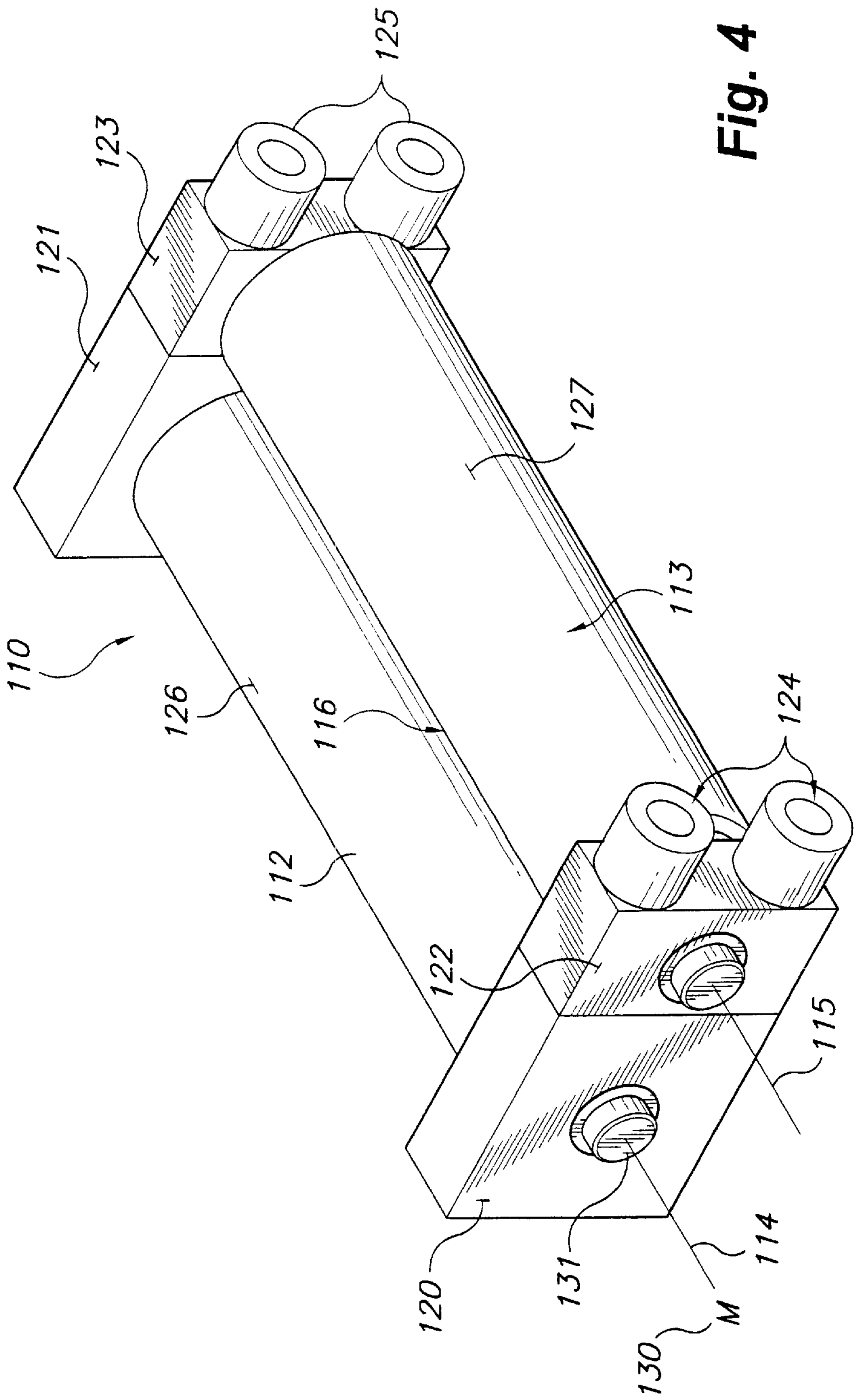
FIG. 4 is a view like that of FIG. 2 for the pressure-seal roller assembly of the FIG. 3 embodiment.

Another embodiment according to the present invention is illustrated in FIGS. 3 and 4. In this embodiment components comparable to those in the FIGS. 1A and 2 embodiment are shown by the same reference numeral only preceded by a "1".

In the FIGS. 3 and 4 embodiment, the pressure seal apparatus consists essentially of first and second rollers 112, 113, shown having the same configuration, including with substantially continuous constant diameter peripheral surfaces 126, 127 thereof (see FIG. 4), although it is to be understood that any conventional configuration of the rollers may be provided as described above with respect to the rollers 12, 13. In this embodiment too, mounting blocks 120–123 are utilized, as well as conventional spring biasing devices 124, 125.

In the FIGS. 3 and 4 embodiments, the holding means, in the form of the chute 134, is similar to that in FIG. 1, except that the chute 134 is almost completely vertical, and need not be a fold/flip plate, and may be stationarily (but removably) mounted substantially immediately vertically above the nip 116. Also, in the FIGS. 3 and 4 embodiment the motor 130 is a reversible motor for driving at least one of the rollers 112, 113 (in the embodiment illustrated just the first roller 112) alternatively clockwise and counterclockwise, or any other suitable reversible drive means may be provided in place of the reversible motor 130, shaft 131, and belt or chains 132 with conventional pulleys or sprockets. Also, in the FIGS. 3 and 4 embodiment, the diverter 144 may be a substantially tear-drop shape bar or similar element that is automatically moved from the rightmost position in FIG. 3 which guides the form into the nip 116 from the bottom, to the leftmost position illustrated in FIG. 3, which diverts the form 17 from the nip 116 as it is moving downwardly toward the stacking bin 145. The pivotal movement of the bar 144 may be automatic when the rollers 112, 113 are reversed, as by utilizing a stepper motor, cam, solenoid, or any other suitable conventional structure.

The folder 111 illustrated in FIG. 3 is entirely conventional except for the juxtaposition thereof in association with the pressure seal apparatus 110. It includes the conventional feed table 148, first and second fold rollers 146, 147, first and second fold plates 150, 151, respectively, and third and fourth fold rollers 55, 56, the third fold roller 55 cooperating with both the first fold roller 146 and the fourth fold roller 56.

In the method of operation of the folding and sealing procedure utilizing the apparatus 110, 111 in FIGS. 3 and 4, the business forms 17 from the stack 19 (an intermediate construction at that time) are fed one at a time between the rollers 146, 147 up to the first fold plate 150, then from the first fold plate 150 between the rollers 146, 55 into the second fold plate 151 to introduce the second fold therein, and then from the second fold plate 151 to between the rollers 55, 56, which drive the folded form 17 from the folder 111 up to the nip 116, approaching it from below. The folding action provided by the folder 111 is entirely conventional, except for the third and fourth fold rollers 55, 56 discharging the folded form 17 substantially immediately into the nip 116. Note that the diverter bar 144 is in the rightmost position illustrated in FIG. 3 as the folded form 17 is being fed up into the nip 116.

One or both of the rollers 112, 113 Oust the roller 112 in the embodiment illustrated in FIGS. 3 and 4) are driven to move the form 17 up and completely through the nip 116 into the holding device/chute 134, while activating the pressure activated cohesive on the form. After the form 17 has passed completely through the nip 116, the direction of rotation of the rollers 112, 113 is reversed, by reversing the reversible motor 130, to move the form 117 (which is already biased by gravity toward and/or into contact with one of the rollers 112, 113 or the nip 116), and the form 17 is powered through the nip 116 downwardly, deflected by the diverter 144 in the leftmost position illustrated in FIG. 3 so that the folded and now sealed (so that it is held in a folded condition) form 17 is deposited in the stacking bin 145.

The reversing of the motor 130 may be accomplished on a time basis, or by utilizing conventional sensors of any suitable type (such as optical sensors) which sense, for example, when the form is passing through the rollers 55, 56, when it is completely through the nip 116 going upwardly, etc. The motor 130 drives the roll 112 counterclockwise when the form 17 is being moved upwardly through the nip 116, and clockwise when being moved downwardly through the nip 116.

Figure 5:
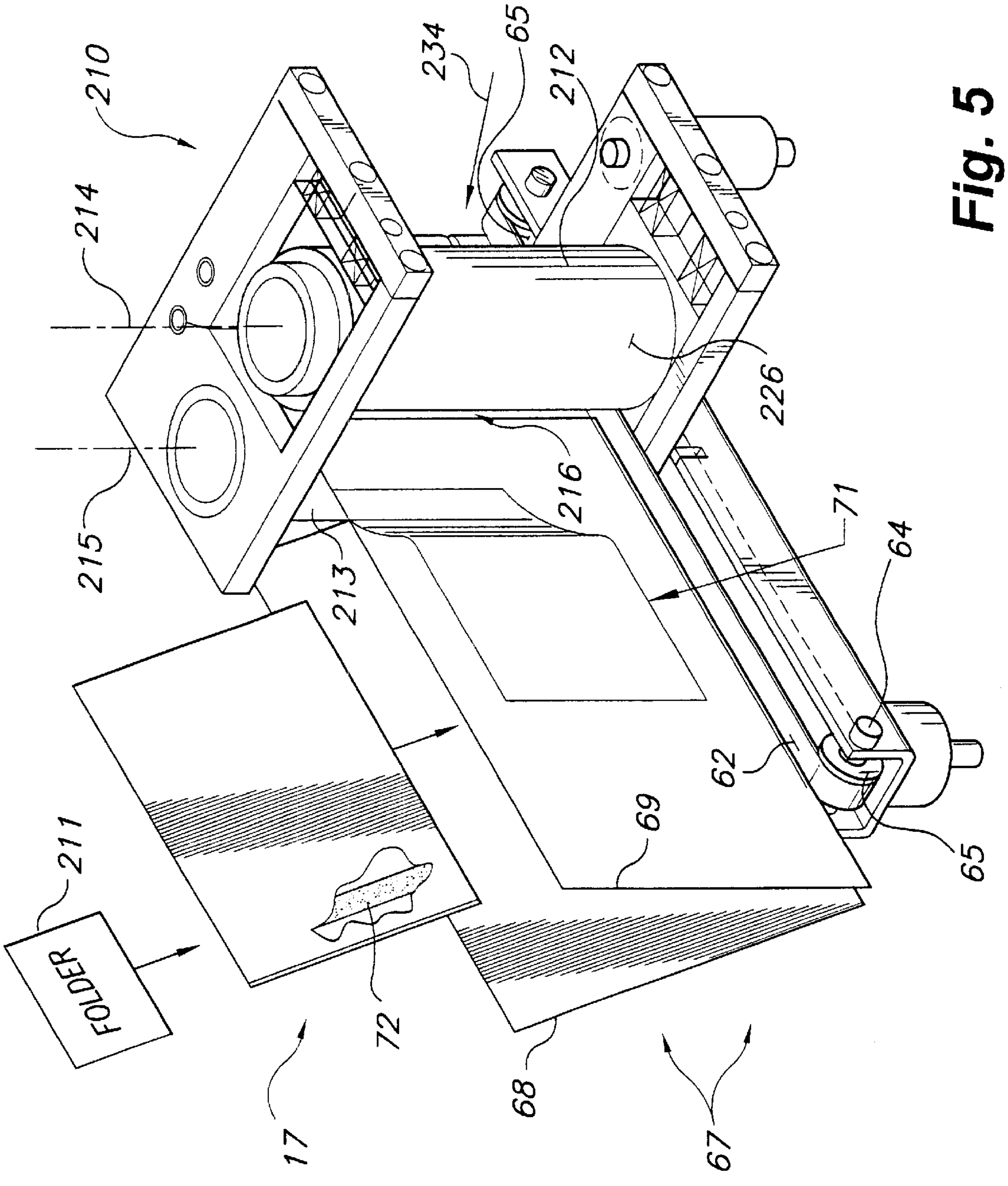
FIG. 5 is a top perspective view of a third embodiment of apparatus for sealing business forms having pressure activated cohesive, according to the invention.
Figure 6:
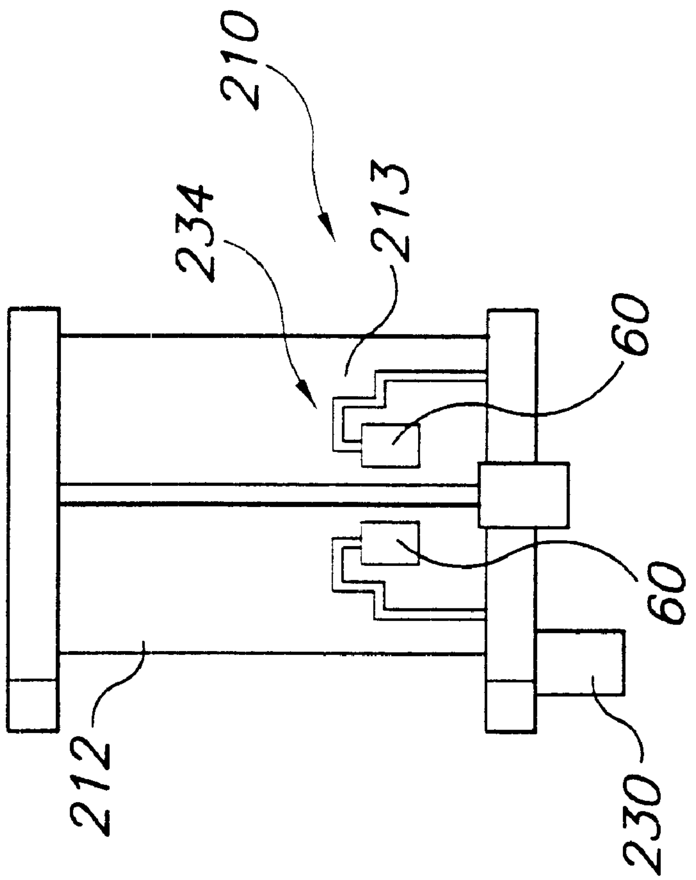
FIG. 6 is a rear schematic view of the apparatus of FIG. 5.

FIGS. 5 and 6 illustrate another pressure seal apparatus according to the present invention. In the FIGS. 5 and 6 embodiment components comparable to those in the FIGS. 1 through 4 embodiments are shown by the same two digit reference numeral only preceded by a “2”.

In the FIGS. 5 and 6 embodiment the axes 214, 215 are preferably substantially vertical, rather than the preferably substantially horizontal axes in the FIGS. 1 through 4 embodiments. The motor 230 is reversible and is part of the conventional drive means for driving the first roller 212. The folder 211 is located above the pressure seal apparatus 210, and not immediately in association therewith.

In the FIGS. 5 and 6 embodiment, the holding means 234 (best seen in FIG. 6) comprises first and second idler nip rollers 60 rotatable about substantially vertical axes. The holding means also preferably comprises a conveyor, such as the conveyor belt 62 driven by a reversible motor (or any other suitable drive device) 230 by rotating the shaft 64 of one of the rollers 65 engaging the belt 62. The conveyor 62 also feeds the form 17 to the nip 216. Alternatively, some other conveyance apparatus for feeding the form 17 to the nip 216 may be provided, and the nip wheels 60 could be powered.

The pressure seal apparatus further preferably comprises a forms guide, shown generally by reference numeral 67, for guiding a form 17 having a substantially upright configuration when deposited by the folder 211 onto the conveyor belt 62. The forms guide 67 may comprise a pair of top-to-bottom converging (as seen in FIG. 5) plates 68, 69 open at the bottom and top, with the bottom just slightly above the conveyor belt 62.

The sealing apparatus 210 also preferably comprises a forms deflector 71 mounted with respect to the nip 216 and constructed so as to allow a business form 17 within the forms guide 67 to pass through the nip 216 into contact with the nip wheels 60, but deflecting the form 17 away from the forms guide 67 when the sealed mailer 17 passes from the idler nip wheels 60 back through the nip 216.

The form 17 illustrated in FIG. 5 has a portion of the top face thereof cut away so as to illustrate, schematically, a pattern (in this case strip) of pressure activated cohesive 72 thereon.

In the method of handling a business form 17 having patterns of cohesive 72 thereon utilizing the apparatus 210 of FIGS. 5 and 6, a folded business form 17 from folder 211 is fed to a first position on the first side (the side ilustrated in FIG. 5) of the nip 216, as by being guided by the forms guide 67 into contact with the conveyor belt 62 while the form 17 is in a substantially vertical plane, as illustrated in FIG. 5. Then the form 17 is moved substantially horizontally into the nip 216, as by at least an initial movement with the conveyor belt 62 being rotated by the reversible drive 230 so that the top surface thereof moves toward the nip 216. Then one or both of the pressure-seal rollers 212, 213 is/are driven to move the form 17 substantially horizontally through the nip 216 into contact with the holding device, such as the idler nip wheels 234/60, while activating the pressure activated cohesive 72 on the form 17. Then, after the form 17 has passed completely through the nip 216, the direction of rotation of the pressure-seal rollers 212, 213 is reversed (e.g. by reversing the motor 230) and the direction of rotation of the conveyor belt 62 is reversed (e.g. by reversing the motor 63) to move the form back toward the first side of the nip 216, through the nip 216, to effect activation of the pressure activated cohesive 72 on the form so that the form 17 is held in the folded condition illustrated in FIG. 5. During the movement back from the holding device 234, 60 through the nip 216, the deflector 71 deflects the form 17 away from the forms guide 67, and onto another apparatus such as a stacking bin, conveyor, or any other suitable conventional device, or it may be moved by the operator by hand.

In the FIGS. 5 and 6 embodiment, the reversing action of the motor 230 and the drive 63 may be accomplished by any suitable devices, such as the conventional means described above with respect to the FIGS. 3 and 4 embodiment.

It will thus be seen that according to the present invention a very effective apparatus and method have been provided for pressure sealing, and typically also folding, business forms, such as mailer type business forms, having pressure activated cohesive thereon, and in a substantially automatic (automatic or at least semi-automatic) manner, and in such a way that the forms are passed completely through the nip each time a sealing action/pass is practiced; yet the apparatus and method are simple and relatively inexpensive.

While the invention has been herein shown and described in what is presently conceived to be the most practical and preferred embodiment thereof, it will be apparent to those of ordinary skill in the art that many modifications may be made thereof within the scope of the invention. which scope is to be accorded the broadest interpretation of the appended claims so as to encompass all equivalent apparatus and methods.

What is claimed is:

1. A method of handling a business form having patterns of pressure activated cohesive, using first and second pressure-seal rollers rotatable about substantially vertical axes and defining a nip therebetween, and a holding device on a second side of the nip opposite a first side, comprising substantially automatically:

(a) feeding a folded business form having patterns of pressure activated cohesive to a first position on the first side of the nip;

(b) moving the form substantially horizontally into the nip;

(c) driving one or both of the pressure-seal rollers to move the form substantially horizontally through the nip into contact with the holding device while activating pressure activated cohesive on the form; and (d) after the form has passed completely through the nip, reversing the direction of rotation of the pressure-seal rollers to move the form back toward the first side of the nip through the nip to effect activation of pressure activated cohesive on the form so that the form is held in folded condition.

2. A method as recited in claim 1 further comprising (e) automatically diverting the form away from the first position during the practice of (d).

3. A method as recited in claim 2 wherein (a) is practiced by effecting guided substantially downward movement of the folded form while the form is in a substantially vertical plane.

* * * * *